July 28, 1959  F. W. BOHN  2,896,735
SAFETY FRAME FOR VEHICLES
Filed Sept. 30, 1957  3 Sheets-Sheet 1
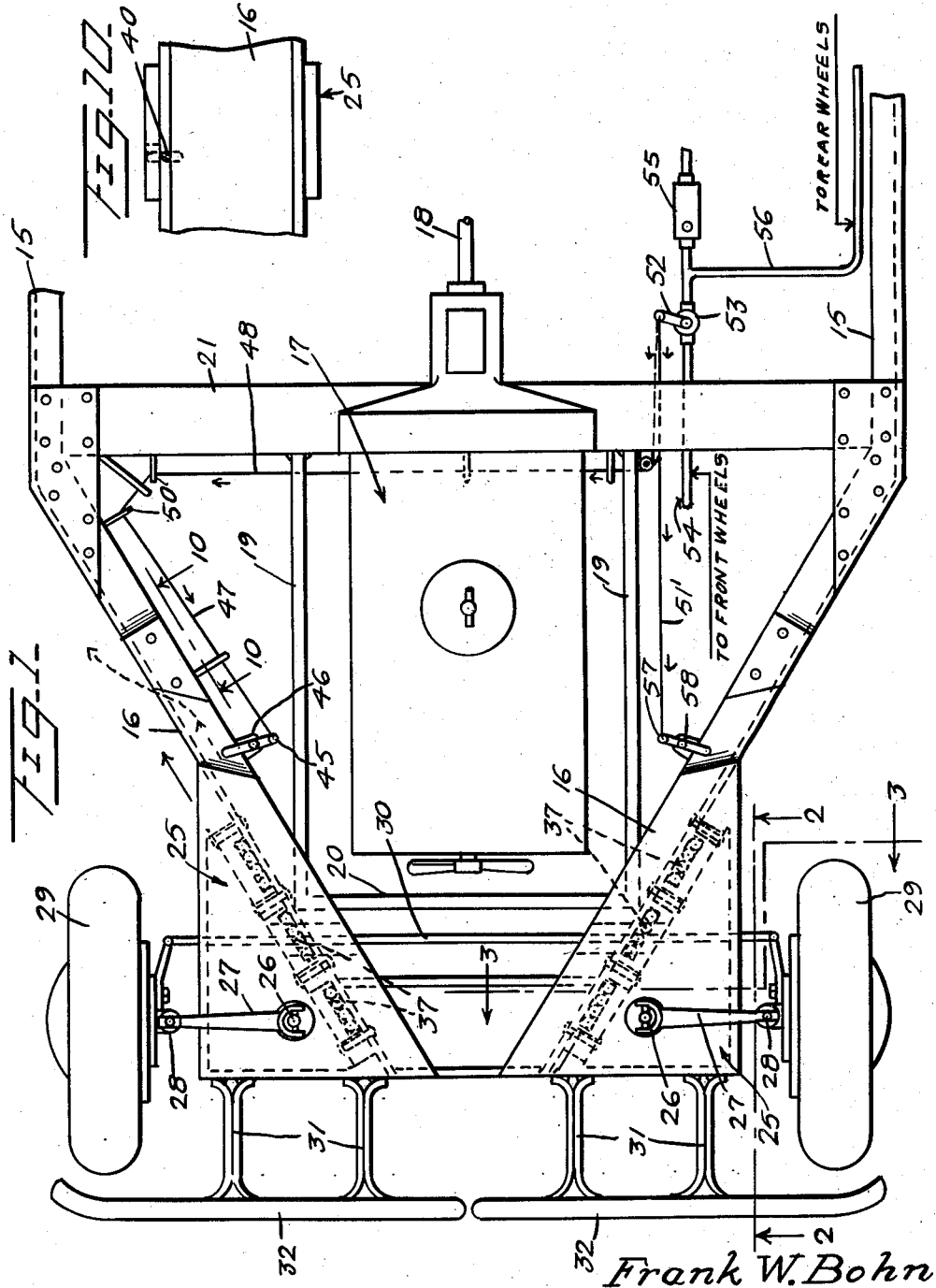
Frank W. Bohn
INVENTOR
BY CA Snow &Co.
ATTORNEYS.

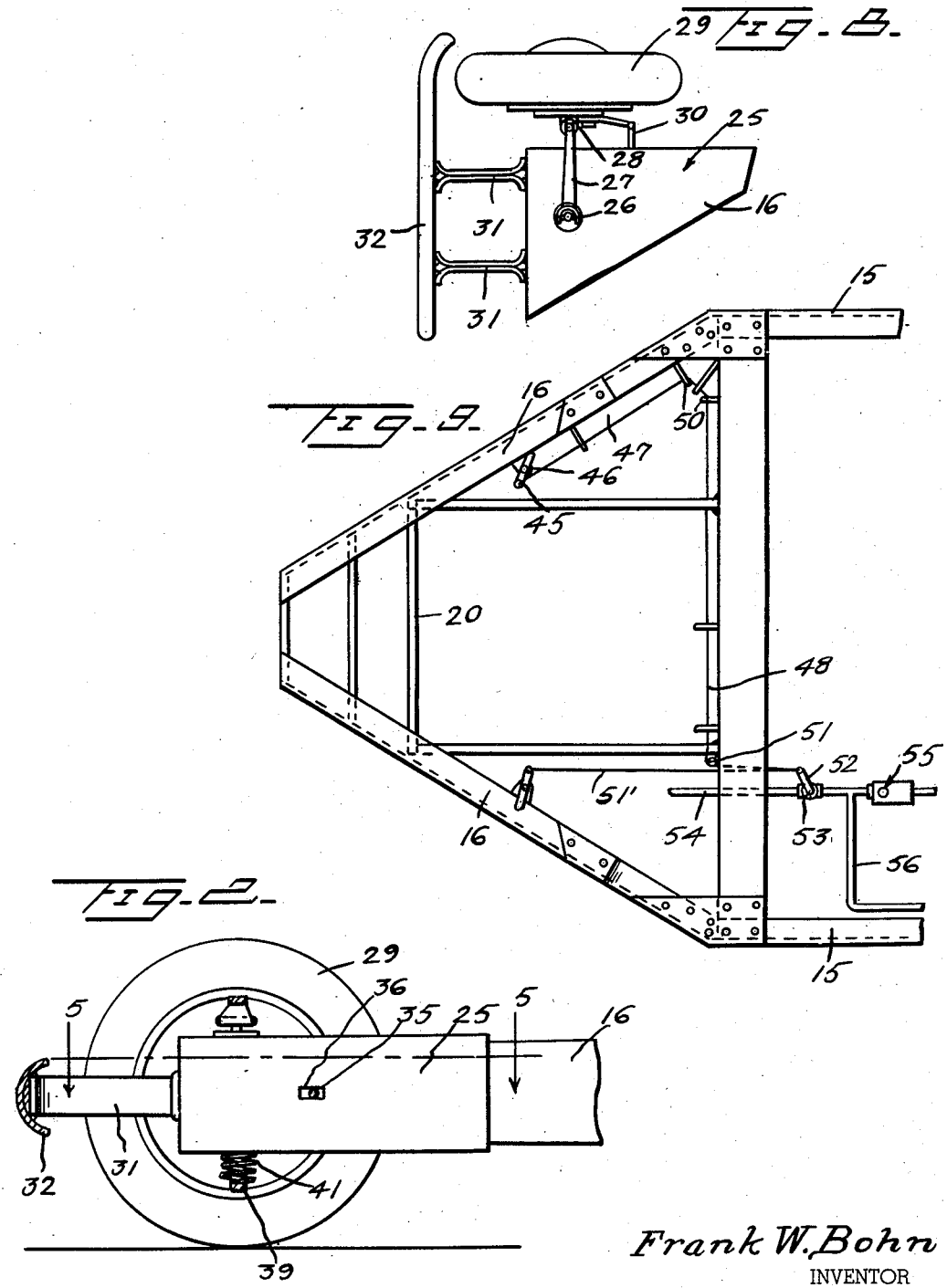

July 28, 1959  F. W. BOHN  2,896,735
SAFETY FRAME FOR VEHICLES
Filed Sept. 30, 1957  3 Sheets-Sheet 3
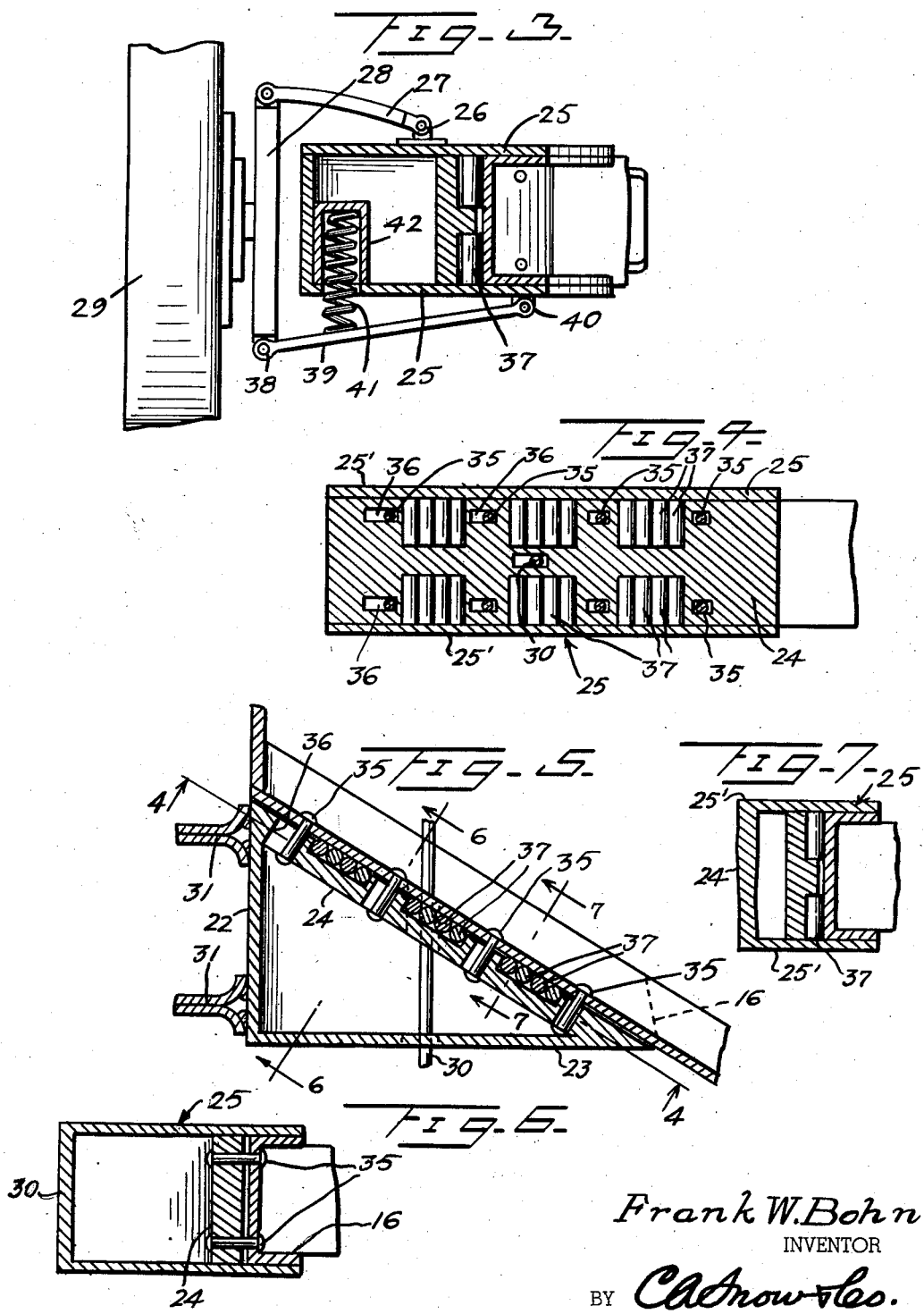
Frank W. Bohn
INVENTOR
BY *Catnow&Co.*
ATTORNEYS.

United States Patent Office 2,896,735
Patented July 28, 1959

2,896,735

SAFETY FRAME FOR VEHICLES

Frank W. Bohn, Scranton, Pa.

Application September 30, 1957, Serial No. 687,244

4 Claims. (Cl. 180—83)

This invention relates to a safety frame for vehicles, preferably motor driven vehicles, and has as its primary object the provision of a safety frame which will serve to reduce damage to the vehicle in the event of a head on collision with either another vehicle or some other object.

A further object of the invention is the provision of a frame of this character provided with shear plates, which will divert a direct impact against the frame into a transverse or laterally angled force, thus reducing the consequence of serious damage to the vehicle, or injury to its occupants.

A further and more specific object of the invention is the provision of such shear plates which are provided with roller bearings, and which are attached to the bumpers of the vehicle, in such manner that immediately upon impact either direct or on either side of the vehicle, one or both of the shear plates will be severed and slide in an angular direction along the frame member, in such manner as to reduce the direct force of the impact.

A still further object is the provision of a device of this character which is operatively connected to a pair of unconnected bumpers, one on either side of the vehicle, so that a force exerted against either side of the vehicle will serve to sever only one of the shear plates.

Still another object of the invention is the provision of a device of this character which is provided with means adapted to be associated with the hydraulic braking mechanism of the vehicle for disconnecting the flow of hydraulic fluid to the front wheels upon impact.

A further object of the invention resides in the provision of an improved safety frame which is characterized by many of the elements of my Patent No. 2,845,144 entitled Shear Pin Brake For Auto Bumpers.

Still other objects reside in the provision of a vehicle frame of this character, which is sturdy and durable in construction, reliable and efficient in operation, and relatively simple and inexpensive to manufacture and assemble.

Still further objects will in part be obvious, and in part be pointed out as the description of the invention proceeds, and shown in the accompanying drawings wherein:

Figure 1 is a top plan view of the forward end of the vehicle frame embodying the safety features of the instant inventive concept.

Figure 2 is a sectional view taken substantially along the line 2—2 of Figure 1 as viewed in the direction indicated by the arrows.

Figure 3 is a sectional view taken substantially along the line 3—3 of Figure 1 as viewed in the direction indicated by the arrows.

Figure 4 is a sectional view taken substantially along the line 4—4 of Figure 5 as viewed in the direction indicated by the arrows.

Figure 5 is a sectional view taken substantially along the line 5—5 of Figure 2 as viewed in the direction indicated by the arrows.

Figure 6 is a sectional view taken substantially along the line 6—6 of Figure 5 as viewed in the direction indicated by the arrows.

Figure 7 is a sectional view taken substantially along the line 7—7 of Figure 5 as viewed in the direction indicated by the arrows.

Figure 8 is a fragmentary top plan view of one of the shear plates, as shown in Figure 1, but showing the appearance of the plate, and its connection to the bumper segment, without disclosing details of construction.

Figure 9 is a top plan view of the frame, prior to the application of the shear plates, disclosing constructional details of the braking mechanism.

Figure 10 is an enlarged side sectional view taken substantially along the line 10—10 of Figure 1 as viewed in the direction indicated by the arrows.

Similar reference characters refer to similar parts throughout the several views of the drawings.

Having reference now to the drawings in detail, there are generally indicated at 15 two of the main frame members of the vehicle, the frame rearwardly of this point being of conventional construction.

Connected to these frame members are a pair of oppositely disposed forwardly converging members 16 which are U-shaped in cross-sectional configuration and are in substantially the form of a truncated triangle in plan form. The motor 17 and its associated drive shaft 18 are mounted between converging members 16 in a mounting comprised of a rectangular frame including side members 19, a forward member 20, positioned well rearwardly of the front wheels, and supported upon a transverse frame member 21, which extends between the main frame members 15 at the point where their converging forward members are engaged.

The converging members 16 carry on either side thereof a pair of substantially triangular plates 25' which form a part of the shear plate structure 25. The upper one of the plates 25' carries a pin, 26, to which is secured a link 27 which in turn is pivotally secured as by a pivot 28 to one of the front wheels 29. The front wheels are connected by the conventional tie rod 30, and are simultaneously operable in a conventional manner from the steering wheel of the vehicle, excessive strain shearing off tie rod 30.

Each of the shear plates 25 has extending forwardly therefrom a pair of bumper supports 31, and to each pair of supports there is secured a bumper segment 32, which extends substantially half of the width of the vehicle, the ends of the bumper segment being closely juxtaposed so that they are each operative independently, but the separation between the two is insufficient to permit the impact of any object between them.

The shear plates 25 are as best shown in Figures 4, 5, 6 and 7 and are box-like in configuration, and comprise the previously stated plates 25' as well as side plates 22, 23 and 24, the last characterized one of which is thicker than the other plates in this structure, and contains a plurality of elongated openings 36 in horizontal spaced relation to one another. The elongated openings progressively decrease in length toward the rear of the vehicle, openings in the side of converging members 16 permitting the securing of shear pins 35 of shear plates 25 to converging member 16, the purpose of this being to absorb the primary impact, and, if the impact is light to permit a relative movement of the first shear pin before its severance.

The shear pins 35 are of sufficient tensile strength to normally hold the parts of the vehicle in assembled relation, but are of sufficient weakness to be severed by impact, to permit the sliding movement of the plates 25' along the converging members 16 of the frame, thus materially reducing the force of impact, and hence reducing the danger of severe injury to the passengers of the vehicle. Returning again to plate 24 it will be seen from examination of Figs. 4 and 5 that this plate 24 also contains a plurality of recesses in horizontal and vertical spaced relation to one another for the mounting of roller bearings 37 which provide a rolling contact between shear plates 25 and side converging members 16, in order to facilitate movement of the shear plates upon impact, and effect a reduction in the force of impact required to sever or dislodge the shear plates 25.

A further connection to the pivot 28 from the plate 25 is afforded by a pivotal connection 38, with a link 39, which is in turn pivotally connected as at 40 to the under side of the shear plate 25, and which is biased downwardly by means of a spring 41 which seats in a cup 42 carried by the shear plate 25.

Mechanism is provided for discontinuing the flow of hydraulic fluid to the front wheel brakes when either of the shear plates 25 is moved backwards on converging members 16 upon impact of the bumper segment 32. This mechanism which is illustrated in Fig. 1, comprises a lever 45 pivoted as at 46 on a deflector plate 47 of converging member 16, which is adapted to be rotated upon rearward movement of either of the shear plates 25. The lever is turn is connected to a wire 48, which on one side of the vehicle extends through suitable loops 50, and on the other side of the vehicle extends directly, as indicated at 51 to a lever 52, which controls a valve 53, thus discontinuing the flow of hydraulic fluid through a pipe 54 to the previously stated front wheel brakes of the vehicle upon impact thereagainst.

The pipe 54 comprises a part of the normal hydraulic brake system 55, which also includes a pipe 56 adapted for application of hydraulic fluid to the rear wheels. Upon application of the brake, obviously the rear wheels will continue to brake, while flow of fluid to the forward wheels will be discontinued. If it were not for the above described mechanism discontinuing the flow of hydraulic fluid at the valve 53 when the shear plates 25 are driven backward by an impact, the fluid would all drain out the hydraulic system when the hydraulic lines to the brakes would be broken by the stated impact, in which case none of the brakes would be able to work and the vehicle would be left without braking power when it is most needed.

The wire 51' is directly connected to the lever 52, and extends from a lever 57 pivoted as at 58 to effect the shutting off of fluid to the front wheels upon the impact of the other shear plate. It will thus be seen that an impact on either or both shear plates, sufficient to sever the same from its associated shear pins will be sufficient to discontinue the flow of fluid to the front wheels.

Now from the foregoing it will be seen that there is herein provided an improved safety frame for vehicles, which is adapted to be employed with automobiles, trucks or similar ground vehicles, which accomplishes all of the objects of this invention, and others, including many advantages of great practical utility and commercial importance.

As various embodiments may be made of this inventive concept, and as various modifications may be made in the embodiment herein before shown and described, it is to be understood that all mater herein is to be interpreted merely as illustrative and not in a limiting sense.

I claim:

1. In a safety frame for motor vehicles comprising a chassis, a pair of forwardly converging members at the forward end of said chassis, in combination with shear plates box-like in configuration and comprising a plurality of side plates, one of said side plates being thicker than the other said side plate, said thick plate having a plurality of elongated openings in both horizontal and vertical spaced relation to one another, said converging members being U-shaped in cross-sectional view, said converging members having a plurality of openings in both horizontal and vertical spaced relation to one another, a plurality of headed pins passing through said elongated openings in said plates and in said openings of said converging members, said pins thereby slidably securing said shear plates to said converging members, said shear plates having a plurality of recesses in both horizontal and vertical spaced relation to one another, roller bearings in said recesses providing rolling contact between said shear plates and said converging members, a pair of bumper supports horizontally secured at one of their respective ends to said shear plates, and a pair of bumpers secured to the other ends of said bumper supports.

2. The subject matter as claimed in claim 1, and front wheels mounted on said shear plates, a hydraulic brake mechanism, including pipes connecting said brake mechanism with said front wheels, and mechanism for cutting off the flow of hydraulic fluid in said pipes of said brake mechanism on severance of said shear pins by impact upon said bumpers.

3. The subject matter as claimed in claim 2, and said mechanism for cutting off flow of hydraulic fluid in pipes of said brake mechanism comprising deflector plates secured to said converging members, levers pivotally mounted on the forward ends of said deflector plates, said levers being so constructed and arranged as to be operated by rearward movement of said shear plates, wires connected between said levers, said valve providing means of severance of said hydraulic fluid to said hydraulic brakes on said front wheels upon impact of said bumpers.

4. The subject matter as claimed in claim 1, with said elongated openings formed progressively in size from front to rear.

References Cited in the file of this patent

UNITED STATES PATENTS

| | | |
|---|---|---|
| 1,621,997 | Nigro | Mar. 22, 1927 |
| 1,637,152 | Kehrer | July 26, 1927 |
| 1,936,054 | Harzbecker | Nov. 21, 1933 |
| 2,845,144 | Bohn | July 29, 1958 |